Patented Dec. 21, 1937

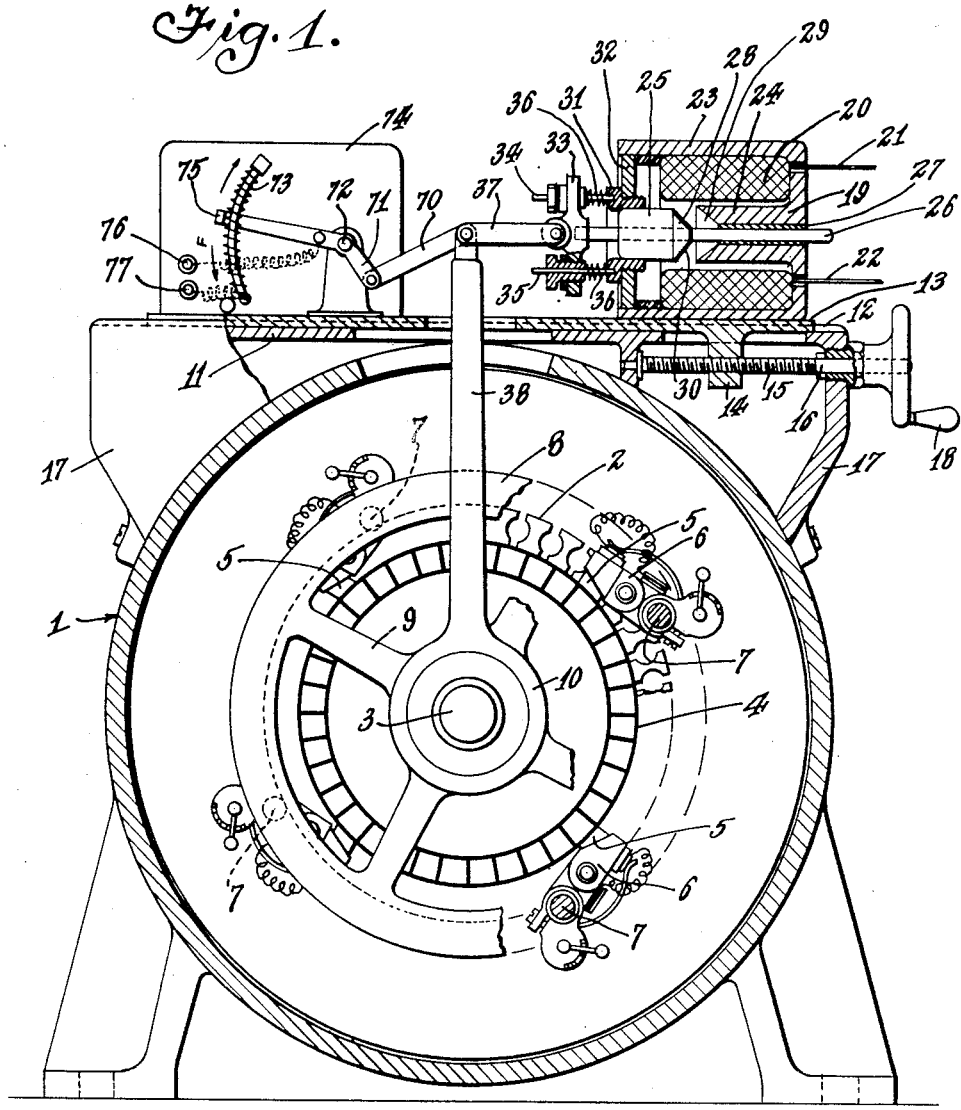

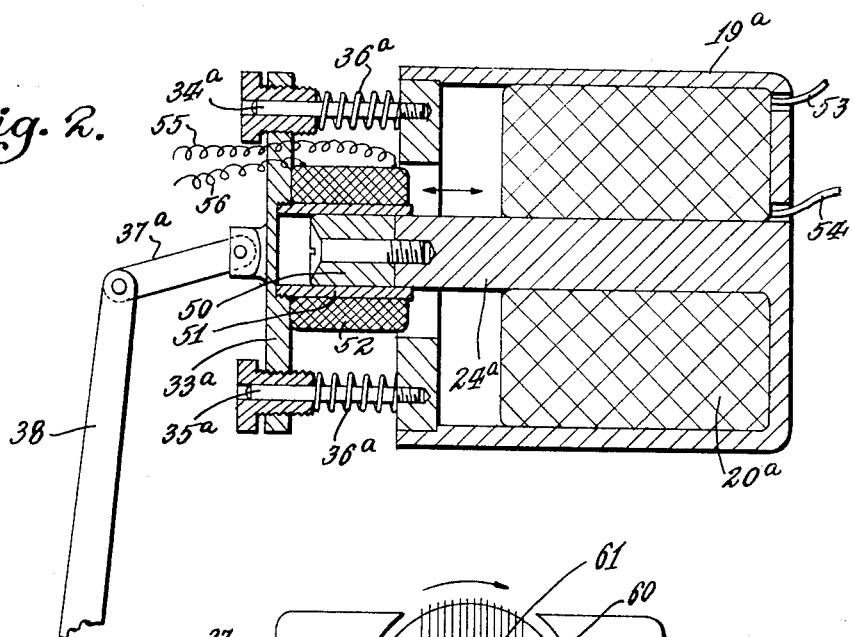
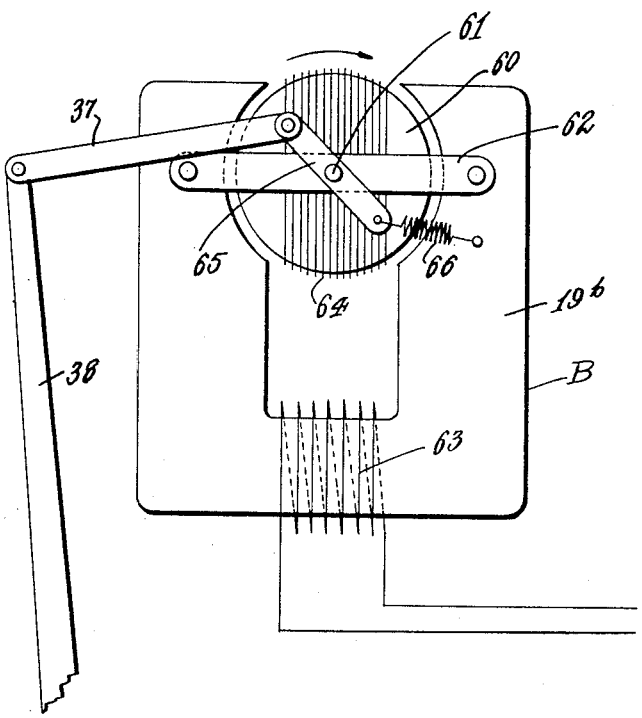

2,102,761

UNITED STATES PATENT OFFICE 2,102,761

WELDING GENERATOR

Karl Strobel, Whittier, Calif., assignor to Karl Strobel Corporation, Los Angeles, Calif., a corporation of California Application October 12, 1931, Serial No. 568,314

2 Claims. (Cl. 219—8)

My invention relates to arc welding and has particular reference to an electric generator employed for furnishing current for electric arc welding purposes.

In the art of electric arc welding, it has been discovered that uniformity of weld, uniformity of penetration, uniformity of great fusion, is dependent upon welding current at the electrodes. This is due to the fact that uniformity of heating, uniformity of penetration, uniformity of great fusion, and avoidance of spots in the weld, depend entirely upon the maintenance of a constant arc current. Heretofore generators have been constructed for arc welding purposes which have been provided with special windings and special compensating devices which are designed to maintain the arc wattage constant, or to maintain the arc voltage constant, but all of these prior generators have failed to produce the desirable condition of a constant current across the arc independent of arc length and independent of the resistance in the electrode circuit.

It is therefore an object of my invention to provide an arc welding generator having means for automatically compensating for variations in the resistance in the electrode circuit to automatically increase or decrease the current output of the generator to maintain a constant current across the electrodes at the point of the arc.

Another object of my invention is to provide a device which automatically responds to variations in the resistance in the electrode circuit for increasing or decreasing the voltage output of the generator, as set forth in the preceding paragraph.

Another object of my invention is to provide a sensitive resistance measuring device which continuously measures the resistance in the electrode circuit and compensates for variation in that resistance by increasing or decreasing the current output of the generator.

Another object of my invention is to provide a generator for electric arc welding in which the current output of the generator is automatically reduced to a predetermined minimum at the instant of striking the arc, thus compensating for the substantially short circuit which is created at this point.

Another object of my invention is to provide a generator for supplying current to arc current electrodes in which the current output of the generator is varied in accordance with variations in the arc length so as to insure a constant current across the arc.

Other objects and advantages will be apparent from a study of the following specifications, read in connection with the accompanying drawings, wherein Fig. 1 is a vertical sectional view taken through a generator constructed in accordance with my invention and illustrating the compensating devices employed in the practice of my invention;

Fig. 2 is a detail sectional view taken through a current measuring device of slightly modified form shown in Fig. 1;

Fig. 3 is a detail diagrammatic view illustrating a still further modification of the current measuring device;

Figure 4:
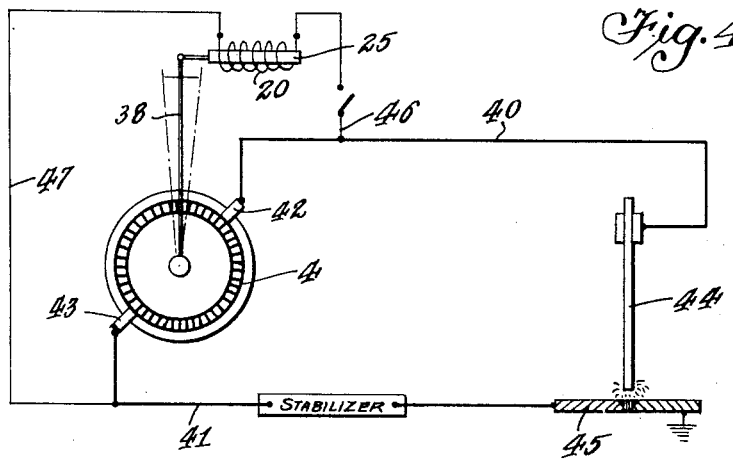
Fig. 4 is a wiring diagram of a generator circuit and electrode circuit which may be employed in connection with the generator constructed in accordance with my invention.

Referring to the drawings, I have illustrated in Fig. 1 an electric current generator comprising a frame 1 constituting the field mounting an enclosure of the type generally employed in connection with electric generators and electric motors. An armature 2 is illustrated as being mounted upon a suitable shaft 3 mounted in bearings (not shown) secured to the frame 1 in the usual manner employed in connection with electric motors and generators.

The armature 2 is illustrated as being provided with suitable commutators 4, of the character generally employed in connection with electric motors and generators. The commutator 4 is engaged by a plurality of brushes 5 secured in suitable brush holders 6 which are in turn each mounted upon a brush holder stub shaft 7, each one of which is secured to a brush mounting ring 8 at spaced intervals about the commutator. The brush ring is illustrated as being mounted upon a spider 9 which terminates in a bearing 10 mounted upon the shaft 3 for rotational movement relative thereto, or the bearing 10 may be mounted upon any suitable bearing structure which is secured to the frame 1 so that the brush ring 8 may be secured concentric with the shaft 3 and may thus be moved around the shaft 3 to variably position the brushes 5 with respect to the commutating plane of the generator.

It will be understood that the generator is provided with suitable field coils and field poles of the usual construction found in connection with electric motors and generators to provide the necessary field in which the armature operates; this structure being omitted from the illustration for the purpose of clarity of the drawings.

Mounted upon the frame 1 is a supporting table 11, which is illustrated as being provided with grooves 12 which constitute guides in which is mounted a sliding bed 13 adapted to be moved laterally with respect to the shaft 3 as by means of a depending lug 14 formed upon the slide 13 engaging the threads 15 of a suitable screw 16 mounted for rotation in the supporting structure 17 for the table 11. The end of the screw 16 is illustrated as being provided with a hand-wheel 18 by which the screw may be rotated to shift the position of the slide 13. Rigidly secured to the slide 13 is the core structure 19 of a resistance measuring device 20. This resistance measuring device comprises an electromagnetic coil, the conductors 21 and 22 of which are arranged, as will be hereinafter described, to receive electric current from the electrode circuit of the generator and thus the voltage which is supplied to the coil 20 will be in direct proportion to the voltage in the electrode circuit.

The coil and core structure 19 and 20 may be of any suitable form, though I prefer the core 19 to constitute a cup-like structure having side walls 23 which extend beyond the end of the coil 20 and is provided with a central boss 24 extending from the rear end of the core 19 to a position well within the center of the coil 20. A movable armature 25 is illustrated as being mounted upon a shaft 26 which extends through a suitable bore in the boss 24 so as to be guided therein, the bore being preferably provided with a bushing 27 of non-magnetic material to prevent adherence between the shaft and the material of the boss 24.

The armature 25 is illustrated as having its inner end 28 in the form of a cone to be received within a conical depression 29 in the end of the boss 24, either the conical end of the armature 25 or the conical depression in the core being lined with a liner of non-magnetic material 30 to prevent adherence of the core and armature. The outer end of the armature 25 is illustrated as being slidably supported in a non-magnetic bushing 31 which may be screwed into an end disc 32 forming a part of the core structure 19. The outer end of the shaft 26 is illustrated as being secured to a cross head 33 mounted upon guide rods 34 and 35 to permit longitudinal movement of the cross head with repect to the core structure 19, the cross head being normally biased to its outermost position by means of a plurality of springs 36.

The cross head 33 is illustrated as being connected by means of a link 37 to an outstanding end of a lever arm 38 which is formed upon the bearing 10 and is thus rigidly secured to the brush mounting ring 8 so that movement of the armature 25 into and out of the core 19 will cause a corresponding rotational movement to be transmitted to the brush mounting ring 8 to thus move the brushes 5 with respect to the commutator plane.

By referring particularly to Fig. 4, it will be observed that the output circuit of the generator comprises a pair of conductors 40 and 41, which extend, respectively, from brushes 42 and 43 (two brushes being illustrated, it being understood that the brush 42 represents a plurality of brushes 5 for current of one polarity while the brush 43 represents a complete set of brushes for current of the opposite polarity). The conductors 40 and 41 are illustrated as being connected to opposite electrodes in the arc circuit. For example, the conductor 40 is illustrated as being connected to an electrode wire 44, while the conductor 41 is connected to the other electrode or to the work-piece 45.

The coil 20 of the resistance measuring device is illustrated as being connected by means of conductors 46 and 47 across the current output of conductors 40 and 41 so that the coil 20 will be supplied with current directly proportional to the voltage across the electrodes 44 and 45. Hence when the generator is operating prior to the establishment of an arc between the electrodes 44 and 45, the voltage output of the generator will be at its highest and the voltage which will be supplied to the coil 20 will be great, thus causing it to attract its armature 25 to draw the same into the coil. This operation results in the movement of the lever arm 38 to shift the brushes in a clockwise direction, as viewed in Fig. 4. The brushes are preferably so connected that a shifting in this direction will cause the brushes to assume a position preparing the generator for its maximum current output, while shifting the brushes in the opposite direction will reduce the current output of the generator.

At the instant of striking the arc, the effect is that of a short circuit across the conductors 40 and 41, the voltage in this circuit being reduced to substantially zero, while the current drawn from the generator is at its maximum. However, when the condition of short circuit occurs, and the voltage is reduced, the voltage supplied to the coil 20 will also be reduced, thus weakening the effect of the coil and permitting the springs 36 to move the armature 25 outwardly and thus rotate the lever arm 38 in a counter-clockwise direction, shifting the brushes back to a position at which the current output of the generator is substantially reduced.

The effect of this initial shifting in the brushes is to automatically reduce the current output of the generator at the time the short circuit condition exists, and hence acts as a safety device, the bracket for the generator preventing any damage to the generator as a result of the short circuit condition and also preventing any damage to the work-piece 45 due to the striking of the arc.

It frequently occurs that with the general types of generators now in practice the striking of the arc damages the work-piece due to the fact that an excessive current flows through the arc at the instant of striking the same. However, it will be apparent that with my device this initial high current condition is avoided and the arc may be struck at any point along the work-piece without danger of injury thereto.

Now as the electrode 44 is drawn away from the work-piece 45 to draw the arc, the voltage across the arc increases and this increase of voltage in the generator output circuit likewise insures a higher voltage applied to the coil 20, thus drawing the lever arm 38 again in a clockwise direction to increase the current output of the generator to compensate for the increase in the resistance across the arc.

The most desirable arc length for welding appears to be approximately one-eighth of an inch, and the design of the coil 20 and the springs 36 should be such that with an arc length of ⅛th inch the brushes will be in the correct position to give the desired current across the arc. For example, assuming that the particular work-piece which is to be welded is calculated to require 200 amperes at 25 volts with a certain determined welding speed, and an arc length of ⅛th inch, the generator may be originally set to give the desired 200 amperes by operating the hand-wheel 18 to shift the slide 13 along the grooves 12 to a position at which an arc length of ⅛th inch holds the lever arm 38 in the correct position to produce an output of 200 amperes. This position may be predetermined by calibrating a scale on the table 11 and slide 13 indicating the correct positions for any desired current across the arc.

With such setting of the slide relative to the table, the initial striking of the arc and drawing the same to the correct length of ⅛th inch, will cause the lever arm 38 to assume that correct position which produces a 200 ampere output of the generator. Thus as the work progresses below the arc the correct maintenance of the arc length at ⅛th inch will insure the 200 ampere current across the arc. However, in manual welding it is substantially impossible to maintain the arc length at a constant value, it being substantially impossible for the operator to accurately follow the contour of the device which is to be welded and to correctly feed the electrode 44 to the work-piece as it is consumed.

Unless the current is maintained at the desired value of 200 amperes, the penetration of the arc into the parent stock will not be constant, but will vary, giving the result of a great penetration at certain points, a much lesser penetration at other points, and the entire weld will not be as strong as the ideal condition of constant penetration throughout the length of the weld.

However, with my device the lengthening of the arc, either due to the withdrawing of the electrode by the hand of the operator or by the normal consumption of the electrode 44, causes an increase in the voltage drop across the arc and therefore causes a greater voltage to be supplied to the coil 20. Each increment of increased voltage supplied to the coil 20 will cause a proportionate shifting of the brushes by the lever arm 38 to the correct position to compensate for the increase in voltage drop. Hence the current output of the generator will be automatically increased to compensate for the increased voltage drop or resistance across the arc and thus, irrespective of the arc length the curent at the arc will remain constant under all conditions, thus insuring the necessary heating and penetration to make a continuous weld of constant depth, constant fusion, and constant strength throughout the length of the weld.

Moreover, it is the usual practice to connect the work-piece 45 to the conductor 41, as by means of a clamp or other contact-making device, which remains fixed throughout the entire weld or throughout a considerable length of weld. Thus it will be observed from an inspection of Fig. 4 that when the electrode 44 is at a point on the work-piece 45 nearest to the point of contact of the conductor 41, the resistance of the work-piece to the flow of current is at a minimum while when the electrode 44 is at some distance along the work-piece away from the point of contact of the conductor 44, a greater amount of resistance is introduced into the electrode circuit. This increased amount of resistance in this circuit would reduce the arc current but with my device this increase of resistance causes a greater supply of voltage to the coil 20 to shift the brushes to the correct position to compensate for the increased resistance in the circuit and thus the constant current of 200 amperes is maintained throughout the length of the weld irrespective of the approach of the weld to the point of contact of the conductor 41.

Thus it will be observed that without requiring unusual care on the part of the operator and without requiring skilled calculation and manual compensation for variations in arc length and in resistance in the electrode circuit, an entirely uniform weld may be made with my device in which, due to the fact that the current is maintained at a constant value at the arc, the penetration of the weld will be entirely uniform throughout its length.

It will therefore be observed that the coil 20 and its associated armature 25, with the mounting of the brushes to be moved by the leverarm 38, constitutes a sensitive resistance measuring device which insures accurately the resistance in the output circuit of the generator and acts automatically to compensate for variations in this instance to maintain a constant current condition at the arc.

Referring particularly to Fig. 2, it will be observed that the resistance measuring device may comprise what is known as a movable coil magnetic structure comprising a core 19ᵃ of substantially the same construction as that described with reference to Fig. 1. The core 19ᵃ is illustrated as a cup-like structure having a central boss 24ᵃ extending therethrough, the core structure housing a coil 20ᵃ.

In this modification, however, the boss 24ᵃ extends beyond the left-hand end of the coil 20ᵃ and terminates in a cylindrical end 50 preferably formed of non-magnetic material. The end 50 constitutes a bearing surface upon which may slide a bushing 51 upon the periphery of which is wound a coil 52. The bushing 51 is illustrated as constituting a part of a movable cross head 33ᵃ which is similar in construction to the cross head 33 described with reference to the bushing 31. The cross head is mounted upon a pair of studs or rods 34ᵃ and 35ᵃ and normaily biased to its extreme left-hand position by means of springs 36ᵃ.

Again the cross head is illustrated as being connected by means of a link 37ᵃ to the leverarm 38 so that movement of the cross head will shift the brushes of the generator in the same manner as was described with reference to Fig. 1.

In the form of the device shown in Fig. 2, however, the coil 20ᵃ constitutes a field coal to be energized with a current of constant voltage and constant amperage, as by means of connecting the lead-in conductors 53 and 54 to any suitable source of constant voltage, such as the exciter which supplies excitation current to the field winding of the generator proper. Thus the movable coil 52 operates in a strong magnetic field created by the coil 20. The movable coil 52 may have its lead-in conductors 55 and 56 connected across the output circuit of the generator in the same manner as the coil 20 was connected across this circuit in the modification shown in Fig. 1.

With this form of the device, it will be apparent that a more sensitive construction is provided in which minute variation in resistance in the electrode circuit will cause a considerable variation in the relation between the magnetic fields of the coil 20ᵃ and the coil 52 so that minute variations will cause minute movements of the leverarm 38 to accurately compensate for such variations.

Referring particularly to Fig. 3, it will be observed that a still further modified form of the resistance measuring device is shown, this form of the device including a field structure comprising a core 19ᵇ constituting in effect a field in which an armature 60 is rotatably mounted as by being journaled to an armature shaft 61 in a suitable bearing member 62 secured to the core structure 19ᵇ. The field structure B is illustrated as being provided with an exciting coil 63 which, like the coil 26ª, may be connected to any suitable source of constant potential, such as an exciter for the generator proper. The armature 60 is provided with an armature winding 64 which, like the coil 62, is connected across the generator output circuit in the same manner as was described with reference to coil 20 in Fig. 4.

A crankarm 65 is illustrated as being rigidly secured to the armature shaft 61 and as connected to its outer end to one end of the link 37 which extends to and is connected with the lever arm 38 for operating the brush mounting ring 8. The opposite end of the crank 65 is illustrated as being biased in a counterclockwise direction, as by means of a spring 66 (corresponding in effect to the springs 36 illustrated with reference to Fig. 1).

The operation of this form of my device is similar to the operation of the form shown in Fig. 1 in that the field coil 63 will create a relatively strong field in which the armature 60 operates so that minute variations in the voltage supplied to the armature winding 64 will cause a considerable movement of the armature about its axis. The movement of the armature 60 will cause a corresponding movement of the lever 38 to shift the brushes 5 to the correct position to compensate for the variation in the resistance of the electrode circuit, and thus cause the current at the arc to be maintained at a constant value independent of changes in resistance in the external circuit.

The construction illustrated in Fig. 3 will be extremely sensitive, in view of the fact that the air gap between the armature and the core structure will remain constant, irrespective of the position of the armature so that variations in the current supplied to the armature winding 64 will cause a proportionate variation in the position of the armature 60, whereas in the devices shown in Figs. 2 and 3, it will be apparent that as the armatures in these figures are drawn into the core structure, the magnetic field circuits will have a variable reaction upon each other.

Figure 5:
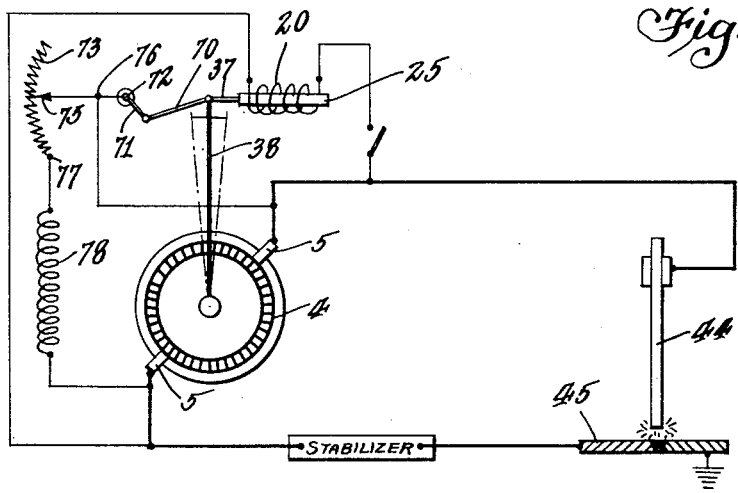
Fig. 5 is a diagrammatic view of a modified circuit which may be employed in connection with my generator.

By referring particularly to Fig. 5, it will be observed that I have illustrated an additional compensating device which may be employed with the construction shown in Fig. 1, 2 or 3. This construction comprises an adjusting device for the field of the generator which will operate in conjunction with the shifting of the brushes.

By referring to Fig. 1, it will be observed that the lever arm 38 is connected by means of an auxiliary link 70 to one arm of a bellcrank 71, pivoted at 72. The other arm of the bellcrank 71 is illustrated as extending beyond a resistor 73 which may be mounted upon any suitable base 74. The extreme end of the bellcrank 71 is illustrated as constituting a contact finger 75 contacting with the resistor 73 in such manner that movement of the bellcrank 71 will cause a greater or lesser amount of resistance to be effectively connected in a circuit between the resistor and the bellcrank. A pair of terminals 76 and 77 are illustrated as being connected, respectively, with the bellcrank and with one end of the resistor 73 so that by connecting the field coil 78 (see Fig. 5), in series with the terminals 76 and 77, the shifting of the brushes by movement of the lever arm 38 will cause a consequent variation in the effective resistance of the field winding circuit to thus further compensate for changes in the resistance of the external circuits of the generator.

For example, assuming that a shifting of the lever 38 in a clockwise direction will cause increase in current output of the generator, the resistor 73 should be so connected that such movement will cause the contact 75 to move toward the terminal 77 and thus reduce the effective resistance in the field circuit, increasing the strength of the field and thus assisting in increasing the current output of the generator.

In like manner, the shifting of the lever 38 in a counterclockwise direction will be accompanied by a movement of the contact 75 away from the terminal 77 to increase the effective resistance in the field circuit and thus reduce the current output of the generator. Thus the combined shifting of the brushes and variation of the field strength of the generator may be employed to compensate for variation in the arc length or in the resistance in the electrode circuit of the generator.

While I have illustrated and described the preferred embodiment of my invention, I do not desire to be limited to the details of construction shown except as defined in the appended claims.

I claim:

1. In an arc welding system, a pair of welding electrodes between which an arc may be struck, said electrodes being subject to rapid relative movement toward and away from each other whereby the length of the arc therebetween is subject to rapid and frequent variations, a generator having an output circuit connected to supply current to said electrodes, said generator having a commutator and brushes contacting said commutator, means mounting said brushes for movement relative to the commutating plane of said generator, an electromagnetic structure comprising a core, a coil on said core, means connecting said coil for constant potential excitation, an armature movably mounted relative to said core, a coil on said armature, means connecting said coil in shunt across the output circuit of said generator, and means connecting said armature to said brush mounting means whereby variations in the resistance of said output circuit will cause a shifting of said brush mounting structure to maintain the current across said arc at a constant value.

2. In an arc welding generator for maintaining constant current output, an armature having a commutator, brushes for said commutator, means mounting said brushes for ready movement about said commutator to change the commutating plane, means for moving said brush mounting means in either direction, electromagnetic means for actuating said moving means, said electromagnetic means being connected in circuit directly across the brushes of said generator whereby increase in potential across said brushes will move said brushes to increase the current output of said generator and decrease in potential across said brushes will move said brushes to decrease the current output of said generator, said electromagnetic means including a movable coil mechanically connected to said brush mounting means, and a stationary exciting coil, and means supplying said exciting coil with a constant exciting potential.

KARL STROBEL.